(12) United States Patent
Abeygunawardana et al.

(10) Patent No.: US 12,507,830 B2
(45) Date of Patent: Dec. 30, 2025

(54) ADJUSTMENT APPARATUS FOR A STAND MIXER

(71) Applicant: Haier US Appliance Solutions, Inc., Wilmington, DE (US)

(72) Inventors: Danister Abeygunawardana, Jefferson, IN (US); Tomas Garces, Louisville, KY (US); Eric Matthew Lewis, Louisville, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 701 days.

(21) Appl. No.: 17/887,039

(22) Filed: Aug. 12, 2022

(65) Prior Publication Data
US 2024/0049916 A1 Feb. 15, 2024

(51) Int. Cl.
*A47J 43/00* (2006.01)
*A47J 43/044* (2006.01)

(52) U.S. Cl.
CPC .... *A47J 43/044* (2013.01); *A47J 2043/04472* (2013.01)

(58) Field of Classification Search
CPC .................................................. A47J 43/044
See application file for complete search history.

(56) References Cited

U.S. PATENT DOCUMENTS

| | | | | |
|---|---|---|---|---|
| 4,500,210 | A | * 2/1985 | Vilen | A21C 1/02 366/279 |
| 10,799,072 | B2 | 10/2020 | Ambrose et al. | |
| 2020/0238236 | A1* | 7/2020 | Branson, III | B01F 27/213 |

FOREIGN PATENT DOCUMENTS

WO  WO2007075167 A1  7/2007
WO  WO2014207485 A1  12/2014

* cited by examiner

*Primary Examiner* — Anshu Bhatia
(74) *Attorney, Agent, or Firm* — Dority & Manning, P.A.

(57) ABSTRACT

A stand mixer includes a column. A bowl support is mounted to the column such that the bowl support is vertically translatable on column. An adjustment apparatus is configured for adjustment of a height of a bowl on the bowl support. The adjustment apparatus includes a cam rotatably mounted on the column and a cam follower coupled to the bowl support and engaging the cam. The cam and cam follower are configured such that the bowl support vertically translates in relation to the column as the cam rotates.

12 Claims, 6 Drawing Sheets

ADJUSTMENT APPARATUS FOR A STAND MIXER

FIELD OF THE INVENTION

The present disclosure relates generally to bowl supports for stand mixers and to fine adjustment of a height of a bowl on a stand mixer.

BACKGROUND OF THE INVENTION

Stand mixers generally include a support for mounting a bowl on the stand mixer during operation. However, to use the stand mixer, the bowl is typically mounted on the mixer in a first, non-mixing position, at which ingredients may be introduced into the bowl and the mixer may be prepared for mixing. From the first, non-mixing position, the bowl is lifted into a second, mixing position, at which the contents of the bowl are brought into contact with a mixing attachment and mixing is performed.

In conventional stand mixers, the contents of the bowl may not be in the optimal position to be completely and efficiently mixed in the mixing position. Moreover, if the bowl is too low, then the contents at the bottom of the bowl may be insufficiently mixed. Conversely, if the bowl is too high, then contents near the top of the bowl may not be in suitable contact with the mixing attachment.

A stand mixer with feature for fine adjustment of a height of a bowl on the stand mixer, e.g., to ensure that mixing of ingredients by the mixer is efficient and complete, would be useful.

BRIEF DESCRIPTION OF THE INVENTION

Example aspects of the present subject matter provides a stand mixer with features for fine adjustment of a vertical position of a bowl on a bowl support. A method for fine adjustment of a vertical position of a bowl of a stand mixer is also provided. Aspects and advantages of the invention will be set forth in part in the following description, may be apparent from the description, or may be learned through practice of the invention.

In one example aspect, a stand mixer includes a column. A slider carriage is mounted to the column. A bowl support is mounted to the slider carriage such that the bowl support is vertically translatable on the slider carriage relative to the column. An adjustment apparatus is configured for adjustment of a height of the slider carriage on the column. The adjustment apparatus includes a cam rotatably mounted on the column and also includes a cam follower coupled to the slider carriage and engaging the cam. The cam and cam follower are configured such that the slider carriage vertically translates in relation to the column as the cam rotates.

In another example aspect, a method for adjustment of a height of a bowl of a stand mixer is provided. The stand mixer includes a column, a bowl support, a cam rotatably mounted to the column, and a cam follower mounted to the bowl support and engaged with the cam. The method includes rotating the cam in order to vertically translate the bowl support relative to the column.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
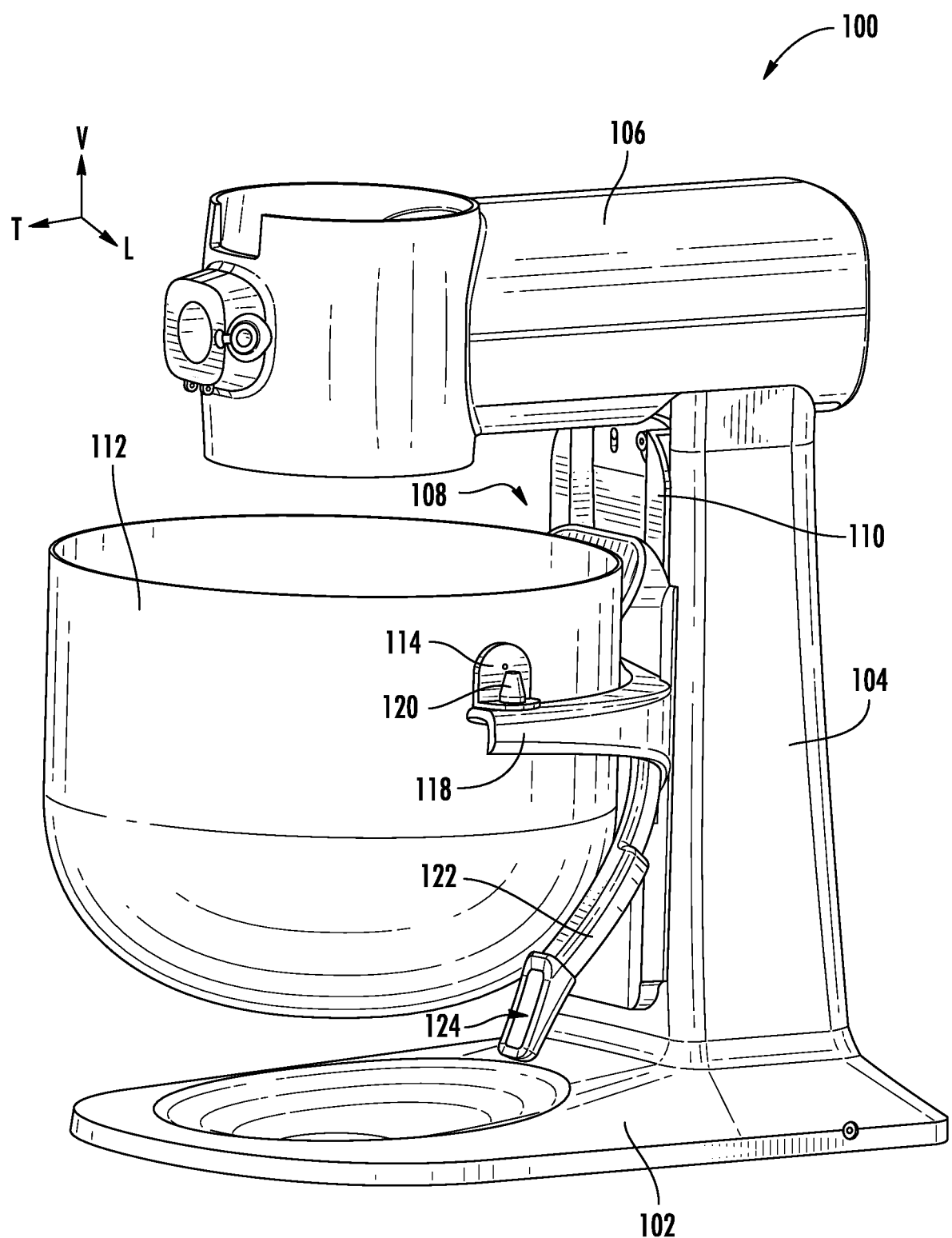
FIG. 1 is an isometric perspective view of an example embodiment of a stand mixer of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 and 2, stand mixer 100 may define a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a base 102 and a support post or column 104. The support column 104 may support a mixer head 106, which is positioned atop column 104. The mixing head 106 may house a motor, a gearbox, and/or a drivetrain apparatus (not shown) of stand mixer 100. For example, as shown in FIG. 1, head 106 may be mounted to column 104, which is mounted to base 102. Thus, column 104 may extend between and connect base 102 and head 106, e.g., along the vertical direction V. Head 106 may extend outwardly above the base 102, e.g., in the transverse direction T. Column 104 may also include a bowl support 108. Bowl support 108 may slidably mount to a column rail or slider carriage 110, which is mounted to column 104. Additionally, components of bowl support 108 may extend outwardly above the base 102, e.g., in the transverse direction T, and may hold bowl 112 above base 102, e.g., along the vertical direction V. Bowl 112 may be removably mounted on bowl support 108 via flanges 114. Flanges 114 may be on opposite sides of the bowl 112 with respect to the circumference of the bowl. Bowl support 108 will be described in further detail herein.

Example operation of an exemplary embodiment of the stand mixer 100 of the present disclosure is described below. In the operation of stand mixer 100, a user may load food items into bowl 112. The food items may be ingredients, such as flour, water, milk, etc. These items are provided for example purposes only and one skilled in the art would appreciate that there are many more types of food items that may be placed in bowl 112 of stand mixer 100. After loading the food items into bowl 112, a user may turn on a motor to begin the process of mixing, kneading, beating, etc. The motor rotates an attachment attached to stand mixer 100 to complete each of these processes. The processes may be conducted with a respective attachment, such as a mixer blade for mixing, a dough hook for kneading, and a balloon whisk for beating.

As shown in FIG. 1, bowl support 108 may include an arm 118, with a mounting spike 120. Arm 118 may hold bowl 112 via mounting spike 120, which may removably couple to flanges 114. For instance, each mounting spike 120 on arm 118 may be received within a respective flange 114 on bowl 112. Lift lever 122 may rotatably couple to arm 118. There may be at least two lift levers 122. Thus, bowl 112 may be disposed between lift levers 122, e.g., along the lateral direction L. Each lift lever 122 may be positioned on a respective side of bowl 112, such that both a left-handed user and a right-handed user may comfortably operate lift levers 122. Lift lever 122 may have one end 124 cantilevered from support column 104. Such distal end 124 may correspond to a handle for a user to grasp, push, or pull.

Figure 2:
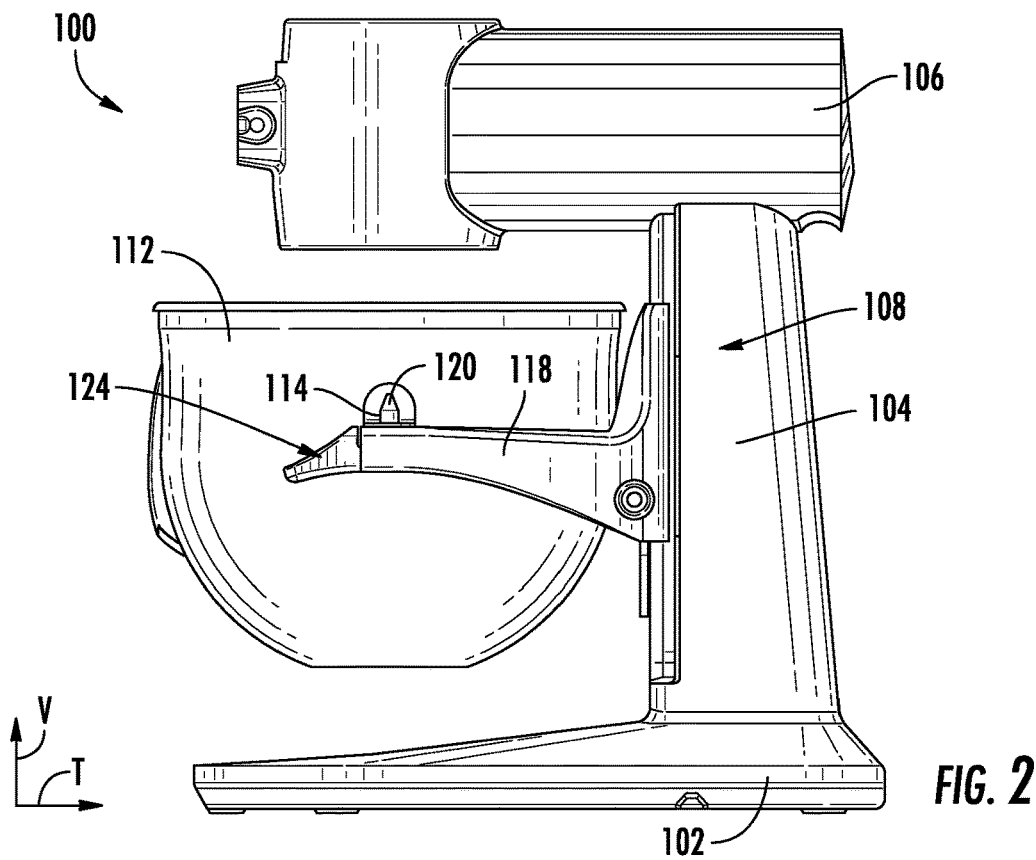
FIG. 2 is a side, elevation view of the example stand mixer of FIG. 1 with a bowl of the example stand mixer shown in an up or mixing position.
Figure 3:
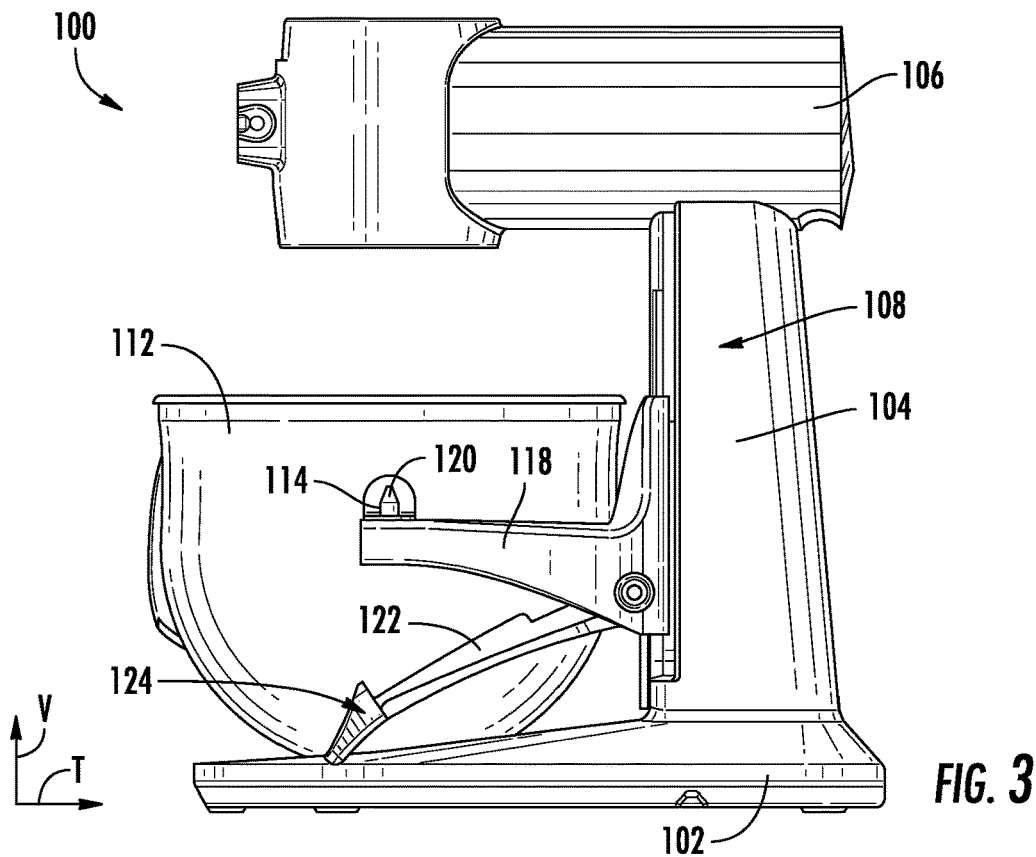
FIG. 3 is a side, elevation view of the example stand mixer of FIG. 1 with the bowl of the example stand mixer shown in a down or non-mixing position.

Referring now to FIGS. 1 and 3, in a first position, otherwise called a down position or non-mixing position, bowl 112 may be lowered into contact with base 102 of stand mixer 100, or proximate above base 102. In the first position, lift lever 122 is disengaged, angled downward toward base 102. Bowl 112 may be in the first position so that there is more space between bowl 112 and head 106 such that ingredients may be added to the bowl 112. Referring now to FIG. 2, in a second position, otherwise referred to as an up position or mixing position, bowl 112 may be elevated vertically from base 102 of stand mixer 100 when lift lever 122 is actuated. For example, when lift lever 122 is actuated, a user rotates lift lever 122 to a horizontal position, as seen in FIG. 2. When bowl 112 is raised, e.g., along the vertical direction V, from base 102, bowl 112 is positioned closer to head 106 for stand mixer 100 to mix the contents of bowl 112.

In example embodiments, the user may be able to finely adjust the height of the bowl 112 in relation to the base 102 using an adjustment apparatus 200. For example, adjustment apparatus 200 may be configured for adjusting a vertical position of slider carriage 110 on column 104. As noted above, bowl support 108 may be mounted to column 104. Moreover, bowl support 108 may be translatable or slidable along the vertical direction V relative to column 104 via adjustment apparatus 200. Utilizing adjustment apparatus 200, a gap between an attachment within bowl 112, such as a mixer blade for mixing, a dough hook for kneading, and a balloon whisk for beating, and a bottom of bowl 112. Thus, adjustment apparatus 200 may assist with allowing a user of stand mixer 100 to advantageously move the vertical location of bowl 112, e.g., closer or further from the attachment within bowl 112.

Referring now to FIGS. 4 through 8, adjustment apparatus 200 may include a cam 210 rotatably mounted on the column 104 and may also include a cam follower 220 coupled to the slider carriage 110. As exemplified in FIG. 4, the cam 210 may include a head 211 and a shaft 212 projecting from the head 211. The cam 210 may also include a cam rotator that is accessible by a user of stand mixer 100 to allow for rotation of the cam 210. In certain example embodiments, the shaft 212 may be rotatably mounted to the column 104, e.g., such that shaft 212 is rotatable about a center axis of the shaft 128. Shaft 212 may couple head 211 and the cam rotator such that head 211 is rotatable with the cam rotator. Thus, e.g., a user of stand mixer 100 may rotate the cam rotator in order to also rotate head 211.

Figure 5:
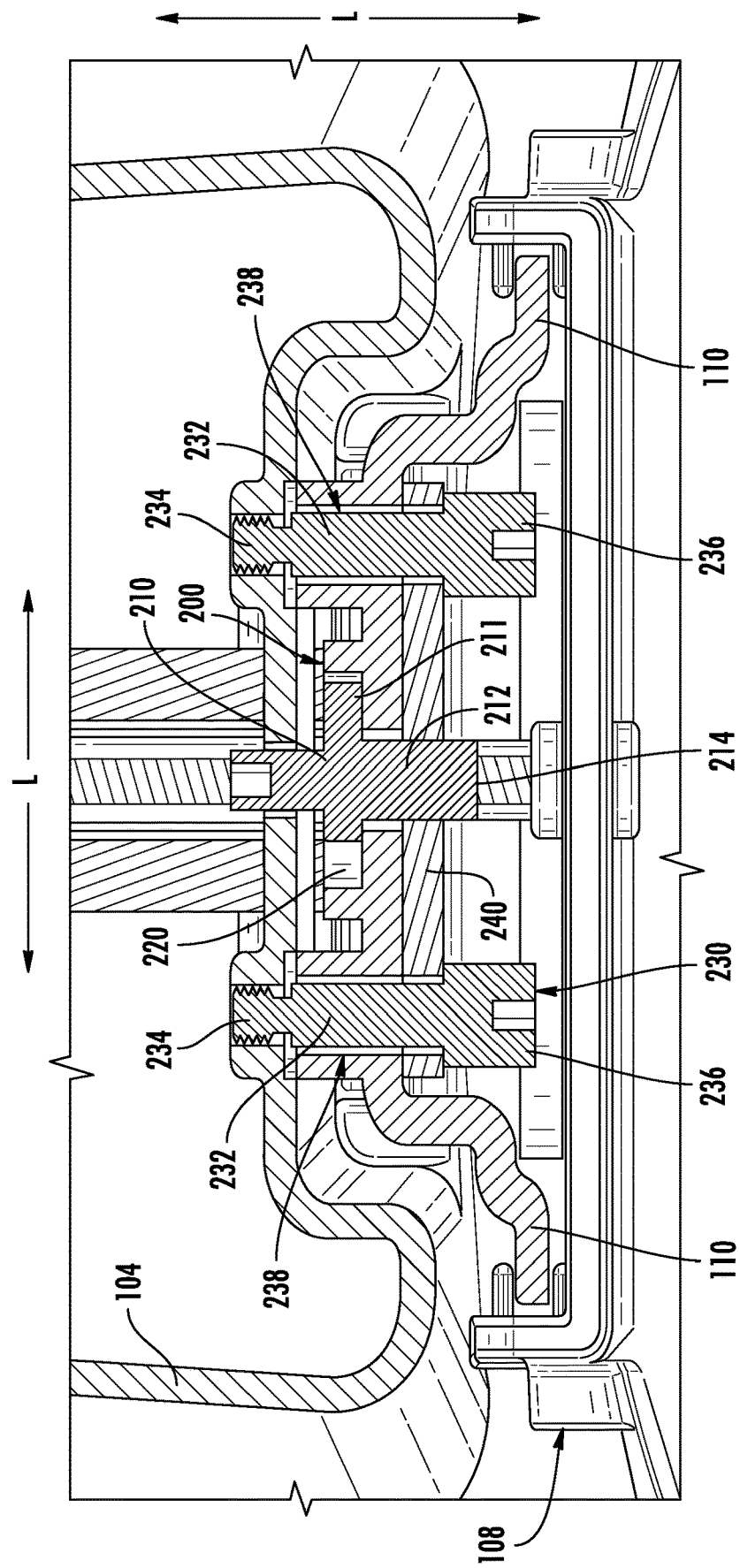
FIG. 5 is a partial top, section view of the adjustment apparatus of the example stand mixer of FIG. 1.
Figure 6:
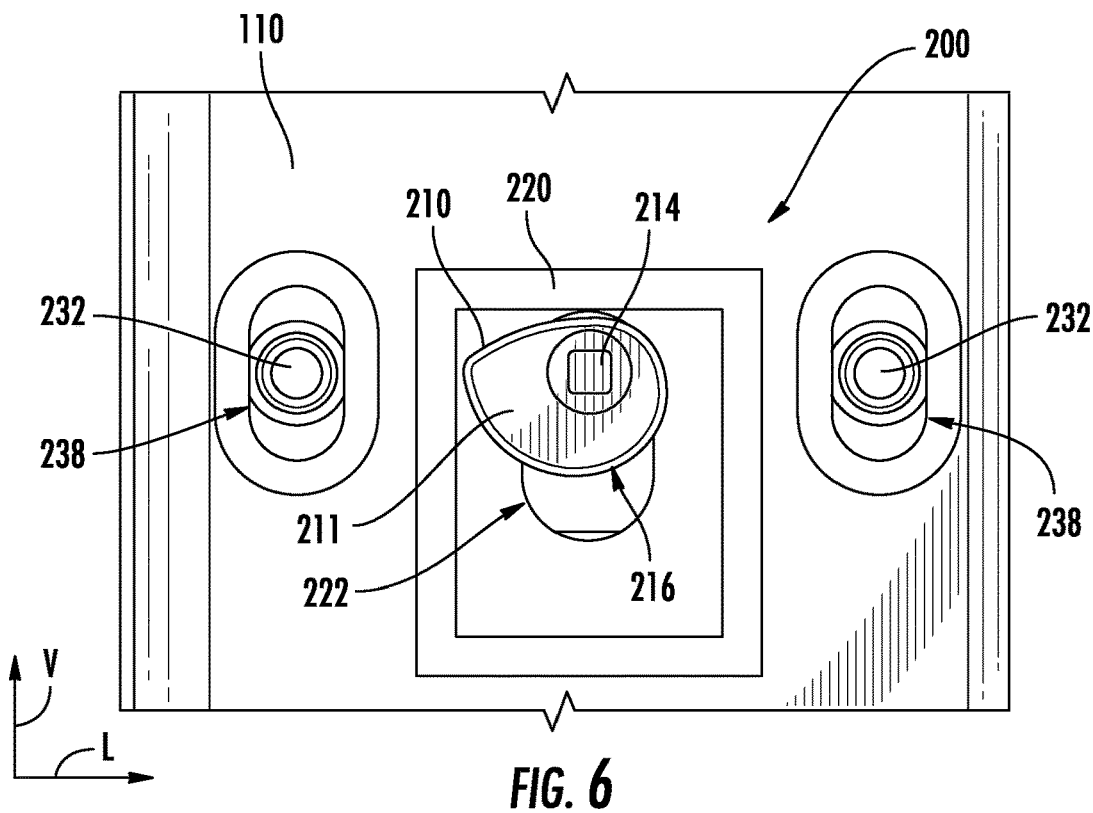
FIGS. 6 and 7 are rear, elevation views of a cam and cam follower of the adjustment apparatus of the example stand mixer in FIG. 1 with the cam in different rotational positions.
Figure 7:
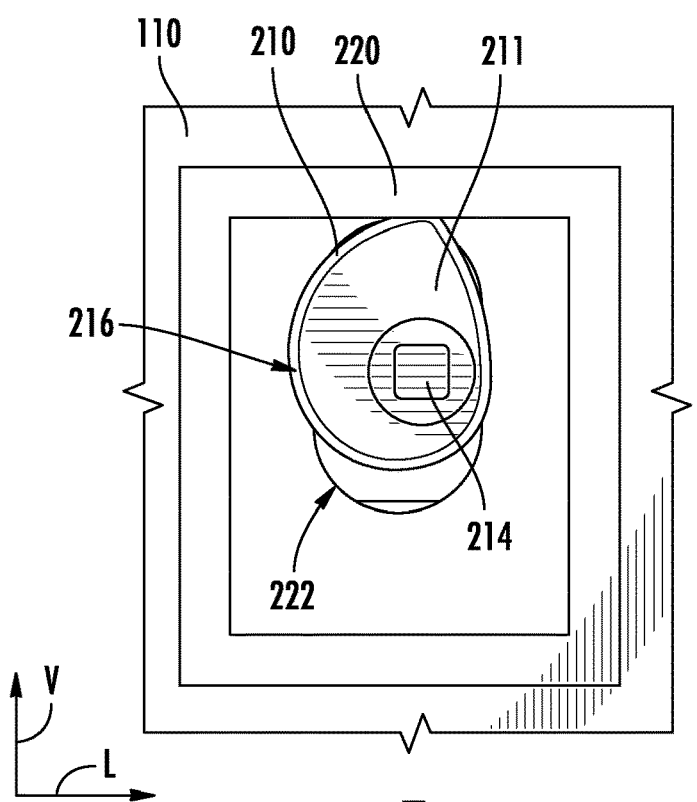

As shown in FIG. 5, cam rotator may include a shaft 212 and a shaft actuator 214. Shaft actuator 214 may be coupled to shaft 212, and shaft 212 may be coupled to head 211. Thus, e.g., shaft 212 may extend between and connect shaft actuator 214 and head 211 in certain example embodiments. For example, slider carriage 110 may define an elongated slot 222, and opposite ends of the elongated slot 222 (e.g., the top and the bottom of the elongated slot 222) may be spaced apart along the vertical direction V. Shaft 212 may be received within elongated slot 222, and elongated slot 222 may permit adjustment of the vertical location of slider carriage 110 on column 104 via adjustment apparatus 200.

A user of stand mixer 100 may rotate shaft actuator 214 in order to rotate head 211 via shaft 212. Shaft actuator 214 may be positioned at an exterior of column 104, e.g., such that shaft actuator 214 is accessible to the user of stand mixer 100. For example, shaft actuator 214 may be positioned at the surface of column 104 facing towards bowl support 108. Shaft actuator 214 may also be positioned at a top of slider carriage 110. Thus, e.g., the user of stand mixer 100 may manually rotate shaft actuator 214, e.g., by grasping shaft actuator 214 or applying a tool, such as a screwdriver or wrench, to shaft actuator 214. In example embodiments, shaft actuator 214 may be a thumb screw, a dial, or an orifice shaped for receiving a tool.

Cam 210 may be shaped such that bowl support 108 translates or slides along the vertical direction V relative to column 104 during rotation of cam 210. In certain example embodiments, the cam 210 may have an irregular shape. As used herein, the term "irregular shape" means that a radial distance from the center axis of the shaft 212 to an engagement perimeter 216 of the head 211 changes along the engagement perimeter 216. Thus, e.g., head 211 may be rotationally asymmetric about the central axis of the shaft 212. Cam 210 may have an irregular shape when the shaft 212 projects from the head 211 at a point offset from a center of the head 211 (e.g., such that head 211 is rotatable on an eccentric axis with shaft 212). As another example, perimeter 216 of the head 211 may be non-circular to provide cam 210 with the irregular shape. In certain example embodiments, the perimeter 216 of the head 211 of the cam 210 may be reniform, elliptical, lens-shaped, etc.

In example embodiments, the cam follower 220 may be coupled or mounted to the bowl support 108. The coupling of cam follower 220 to bowl support 108 may be direct or achieved via a fasteners, adhesive, linkage(s), etc. Cam follower 220 may engage cam 210, e.g., the engagement perimeter 216 of the head 211, such that the cam follower 220 translates in the vertical direction V as the cam 210 rotates. As an example, the irregular shape of cam 210 may cause cam follower 220 to translate along the vertical direction V as the cam 210 rotates. As noted above, cam follower 220 may be coupled to the bowl support 108. Thus, bowl support 108 may also traverse along the vertical direction V along with cam follower 220. Cam follower 220 may be a projection, a wall, or other surface that cam 210 contacts and/or that is fixed to slider carriage 110. For example, cam follower 220 may be integrally formed, e.g., cast into, slider carriage 110.

Figure 8:
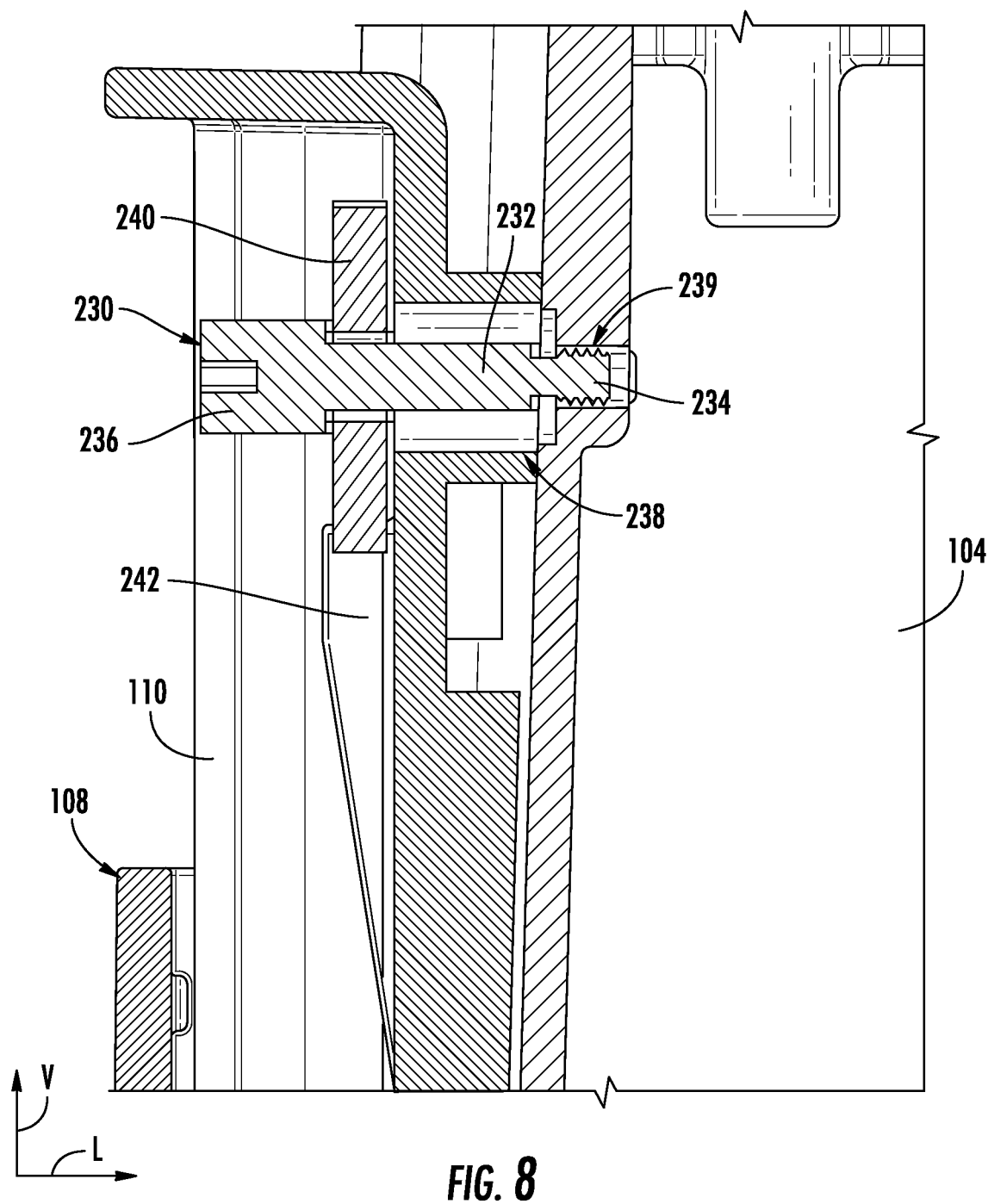
FIG. 8 is a partial side, section view of the adjustment apparatus of the example stand mixer of FIG. 1.

Adjustment apparatus 200 may also include a lock 230. Lock 230 may be configured to selectively secure or fix the vertical location of slider carriage 110 on column 104. For example, lock 230 may be adjusted or engaged such that sliding or translation of slider carriage 110 relative to column 104 is blocked or prevented by lock 230. Lock 230 may include a locking pin 232 and a locking pin receiver 238. As shown in FIG. 8, locking pin receiver 238 may include an elongated slot extending through slider carriage 110. Opposite ends of the elongated slot (e.g., the top and the bottom of the elongated slot) may delimit a traversable distance for the slider carriage 110, e.g., along the vertical direction V.

Locking pin 232 may extending into locking pin receiver 238 in order to fix the height or vertical location of slider carriage 110 on column 104 when the lock is engaged. For example, a first end 234 of locking pin 232 may be received within locking pin receiver 238. Moreover, first end 234 of locking pin 232 may be threaded and engage a threaded surface 239 formed in column 104. A head 236 of locking pin 232 at a second end of locking pin 232, opposite threaded end 234, may be compressed against a slider carriage mounting bracket 240, which compresses against slider carriage 110, due to the threaded connection between locking pin 232 and column 104. The compression of slider carriage 110 via lock 230 may thus fix the height or vertical location of slider carriage 110 on column 104. For instance, a user may rotate head 236 of locking pin 232 to rotate locking pin 232 and engage lock 230.

Head 236 of locking pin 232 may be positioned at an exterior of column 104, e.g., such that head 236 of locking pin 232 is accessible to the user of stand mixer 100. For example, head 236 of locking pin 232 may be positioned at the surface of column 104 facing towards bowl support 108. Head 236 of locking pin 232 may also be positioned at a top of slider carriage 110. Thus, e.g., the user of stand mixer 100 may manually rotate head 236 of locking pin 232, e.g., by grasping head 236 of locking pin 232 or applying a tool, such as a screwdriver or wrench, to head 236 of locking pin 232. In example embodiments, head 236 of locking pin 232 may be a thumb screw, a dial, or an orifice shaped for receiving a tool.

Figure 4:
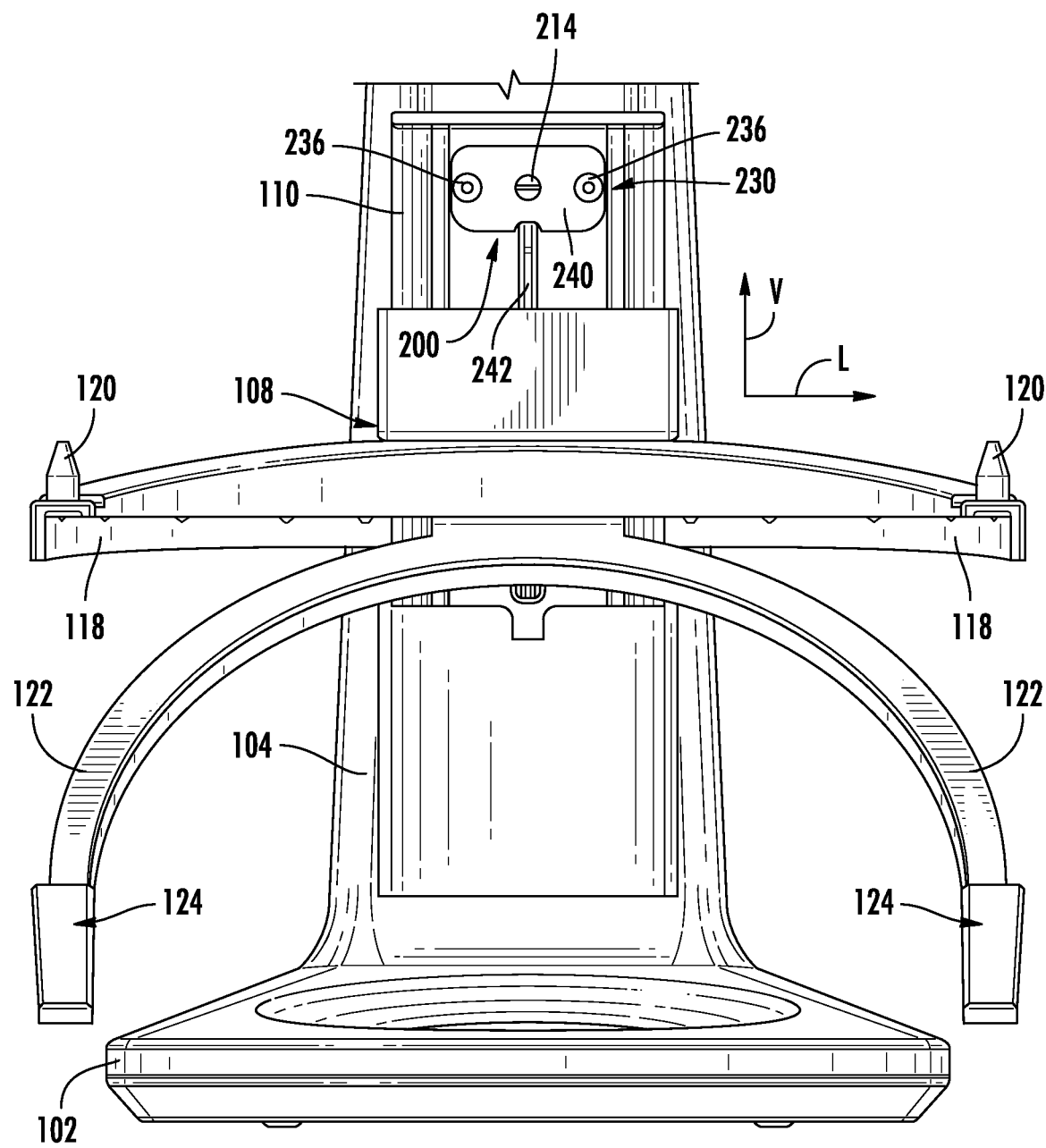
FIG. 4 is a partial side, elevation view of the example stand mixer of FIG. 1 and an adjustment apparatus of the example stand mixer.

Slider carriage mounting bracket 240 may be positioned adjacent slider carriage 110. Locking pin 232 may extend and be affixed to slider carriage mounting bracket 240. Moreover, as shown in FIG. 4, head 236 of locking pin 232 and shaft actuator 214 may be positioned at slider carriage mounting bracket 240. Thus, e.g., a user of stand mixer 100 may access both locking pin 232 and cam 210 at slider carriage mounting bracket 240.

Example operation of adjustment apparatus 200 for fine adjustment of a height or vertical location of slider carriage 110 on column 104 will be described in greater detail below. Moreover, cam 210 and cam follower 220 may be configured such that slider carriage 110 translates along the vertical direction V in relation to column 104 as cam 210 rotates. Cam 210 may be rotated by a user of stand mixer 100 by grasping or applying a tool to shaft actuator 214. As cam 210 rotates, engagement perimeter 216 of cam 210 may slide on cam follower 220. Due to the shape of cam 210, slider carriage 110 may translate along the vertical direction V relative to column 104. Moreover, bowl support 108 may also translate along the vertical direction V relative to column 104 with slider carriage 110. Thus, adjustment apparatus 200 may also be configured for fine adjustment of a height of bowl support 108 on column 104. Such fine adjustment of a height of bowl support 108 on column 104 may assist with controlling a gap between an attachment within bowl 112, such as a mixer blade for mixing, a dough hook for kneading, and a balloon whisk for beating, and a bottom of bowl 112.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer, comprising:
   a column;
   a slider carriage slidably mounted on the column such that the slider carriage is movable along a vertical direction relative to the column;
   a bowl support mounted to the slider carriage such that the bowl support is vertically translatable on the slider carriage relative to the column; and
   an adjustment apparatus configured for fine adjustment of a height of the slider carriage on the column and for adjustment of a height of the bowl support on the column, the adjustment apparatus comprising
      a cam rotatably mounted on the column, and
      a cam follower integrally formed on the slider carriage and engaging the cam,
   wherein the cam and cam follower are configured such that the slider carriage vertically translates in relation to the column as the cam rotates.

2. The stand mixer of claim 1, wherein the bowl support is slidably mounted on the slider carriage.

3. The stand mixer of claim 1, further comprising a cam rotator configured for selectively rotating the cam.

4. The stand mixer of claim 3, wherein the cam rotator comprises a shaft coupled to the cam and a shaft actuator positioned at an exterior of the column.

5. The stand mixer of claim 4, wherein the shaft actuator comprises one of a thumb screw, a dial, and an orifice shaped for receiving a tool.

6. The stand mixer of claim 1, wherein the slider carriage is separate from and affixed to the bowl support.

7. The stand mixer of claim 1, further comprising a lock configured for selectively fixing the height of the slider carriage on the column.

8. The stand mixer of claim 7, wherein the lock comprises a locking pin and a locking pin receiver, the locking pin having a first end and a second end, the locking pin affixed to the column at the first end, the locking pin receiver extending at least partially into the slider carriage, the locking pin extending into the locking pin receiver in order to fix the height of the slider carriage on the column when the lock is engaged.

9. The stand mixer of claim 8, further comprising a slider carriage mounting bracket positioned adjacent the slider carriage, wherein the locking pin is extendable through the locking pin receiver and is affixed to the slider carriage mounting bracket on the second end.

10. The stand mixer of claim 9, wherein the locking pin receiver comprises an elongated slot extending through the slider carriage, and opposite ends of the elongated slot delimit a traversable distance for the slider carriage.

11. A method for adjustment of a height of a bowl of a stand mixer, the stand mixer including a column, a bowl support, a cam rotatably mounted to the column, and a cam follower mounted to the bowl support and engaged with the cam, the method comprising rotating the cam in order to vertically translate the bowl support relative to the column.

12. The method of claim 11, wherein the stand mixer further includes a lock, the method further comprising engaging the lock to affix an adjustment apparatus.

* * * * *